United States Patent
Gylys et al.

(10) Patent No.: US 9,933,514 B1
(45) Date of Patent: Apr. 3, 2018

(54) LADAR SYSTEMS WITH DYNAMIC RECEIVER FILTERS

(71) Applicant: The Boeing Company, Huntington Beach, CA (US)

(72) Inventors: Vytas Thomas Gylys, Bell Canyon, CA (US); Michael C. Cates, Albuquerque, NM (US); Richard A. Niksch, Florissant, MO (US); Paul J. Rodney, Albuquerque, NM (US); Peter Durkin, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 697 days.

(21) Appl. No.: 14/656,533

(22) Filed: Mar. 12, 2015

(51) Int. Cl.
*G01S 17/66* (2006.01)
*G01S 17/08* (2006.01)
*G01S 17/58* (2006.01)
*G01S 7/487* (2006.01)
*G01S 7/481* (2006.01)

(52) U.S. Cl.
CPC .............. *G01S 7/487* (2013.01); *G01S 7/4816* (2013.01); *G01S 17/08* (2013.01); *G01S 17/58* (2013.01); *G01S 17/66* (2013.01)

(58) Field of Classification Search
CPC ........ G01S 17/08; G01S 17/58; G01S 7/4816; G01S 7/487; G01S 17/66
See application file for complete search history.

(56) References Cited

U.S. PATENT DOCUMENTS

| 5,214,484 A | 5/1993 | de Mollerat du Jeu |
| 2004/0263826 A1 | 12/2004 | Langdon |

(Continued)

FOREIGN PATENT DOCUMENTS

| EP | 3067713 A1 * | 9/2016 | ............ G01S 17/08 |
| WO | WO 2014/180483 | 11/2014 | |

OTHER PUBLICATIONS

European Patent Office, Extended European Search Report for related European Patent Application No. 16159560, dated Aug. 18, 2016.

(Continued)

*Primary Examiner* — Daniel Pihulic
(74) *Attorney, Agent, or Firm* — Dascenzo Intellectual Property Law, P.C.

(57) ABSTRACT

LADAR systems and methods are disclosed. LADAR systems include a LADAR transmitter configured to emit a laser signal from a platform and a LADAR receiver configured to detect the laser signal returning from a target moving relative to the platform. The LADAR receiver includes a dynamic receiver filter with a receiver bandwidth (which may be about equal to the linewidth of the laser signal) and a tunable receiver center wavelength. The LADAR receiver is configured to adjust the receiver center wavelength to a wavelength that is Doppler-shifted due to the target velocity. Methods include transmitting a laser signal from a platform, returning the laser signal from a moving target, adjusting a dynamic receiver filter to a receiver center wavelength that is based upon the center wavelength of the returned laser signal (that includes a Doppler offset due to the relative velocity of the target), and receiving the returned laser signal.

20 Claims, 3 Drawing Sheets

(56) References Cited

U.S. PATENT DOCUMENTS

2011/0164783 A1     7/2011 Hays et al.
2016/0084945 A1*    3/2016 Rodrigo .................. G01S 17/58
                                                          356/5.01

OTHER PUBLICATIONS

S. Yakov et al., "Tunable Solid-Etalon Filter for Use in LIDAR Receivers," Earth Observing Systems IX, Proc. of SPIE, vol. 5542, 2004.

M. Powers et al., "Spectral LADAR: Active Range-Resolved Three-Dimensional Imaging Spectroscopy," Applied Optics, vol. 51, No. 10, Apr. 1, 2012.

\* cited by examiner

LADAR SYSTEMS WITH DYNAMIC RECEIVER FILTERS

FIELD

The present disclosure relates to LADAR systems with dynamic receiver filters.

BACKGROUND

LADAR (laser radar, also referred to as lidar) is a technology to determine the distance to and/or position of objects. Additionally, LADAR systems may measure the relative velocity of objects and/or vibrations of objects.

LADAR systems include a laser to deliver light to the target object and an optical receiver to collect the return light. To reduce background light detected at the receiver, LADAR systems use optical filters with a bandwidth narrow enough to reject most scattered sunlight and other sources of background light, and wide enough to transmit substantially all of the return light. For LADAR systems that track high velocity targets (like aircraft and missiles), the Doppler shift of the return photons may limit the minimum useful bandwidth of the receiver filter. Therefore, the optical filters used in current LADAR systems have pass bandwidths wide enough to accept return light from stationary or moving targets (i.e., return light that is significantly Doppler shifted relative to the transmitted laser light). Where the filter bandwidth is wider than the laser linewidth, excess background light may be received by the LADAR receiver, decreasing the signal to noise ratio of the system. Where the filter bandwidth is about equal to the laser linewidth, return light from high velocity targets may be rejected, making such targets 'invisible' to the LADAR system. Therefore, techniques to increase the signal to noise ratio of LADAR systems while permitting tracking of high velocity targets are desirable.

SUMMARY

LADAR systems and methods are disclosed. LADAR systems include a LADAR transmitter configured to emit a laser signal from a platform and a LADAR receiver configured to detect the laser signal returning from a moving target. The laser signal emitted from the LADAR transmitter has a transmitter center wavelength and a transmitter linewidth. The LADAR transmitter is configured to cause the laser signal to return from the moving target (a target moving relative to the platform with a target velocity measured in a direction between the platform and the target). The LADAR receiver includes a dynamic receiver filter with a receiver center wavelength and a receiver bandwidth. The receiver bandwidth is comparable to the transmitter linewidth and may be about equal to the transmitter linewidth. The LADAR receiver is configured to adjust the receiver center wavelength to a wavelength that is the sum of the transmitter center wavelength and a Doppler offset due to the target velocity.

Methods of detecting a LADAR signal include transmitting a laser signal from a platform, returning the laser signal from a target that is moving relative to the platform, adjusting a dynamic receiver filter to a receiver center wavelength that is based upon the center wavelength of the returned laser signal (that includes a Doppler offset due to the relative velocity of the target), filtering the returned laser signal with the dynamic receiver filter, and detecting the filtered laser signal.

DESCRIPTION

Figure 1:
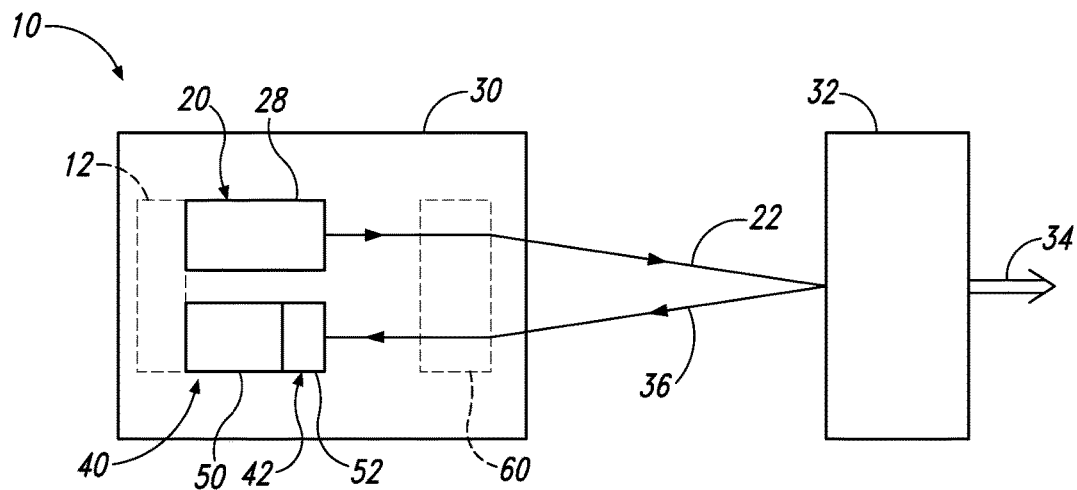
FIG. 1 is a schematic representation of a LADAR system including a dynamic receiver filter.

FIGS. 1-5 illustrate various aspects of LADAR systems with dynamic receiver filters. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a schematic representation of a LADAR system 10 that includes a LADAR transmitter 20 and a LADAR receiver 40 with a dynamic receiver filter 42. The LADAR system 10 is associated with (e.g., contained within, mounted on) a platform 30. The platform 30 may be a mobile structure such as an aircraft, a spacecraft, a satellite, a missile, a land vehicle, and a watercraft, or may be a stationary structure such as a mast, frame, etc.

The LADAR system 10 may include a controller 12 to control and/or to coordinate the activities of the LADAR system components (such as the LADAR transmitter 20 and the LADAR receiver 40). More specifically, the controller 12 may be programmed to perform and/or and may include instructions to perform any of the methods described herein. The controller 12 may include a processing unit, a memory device, and a (non-transitory) storage medium.

The LADAR system 10 and/or the optional controller 12 may be configured to measure the distance between the platform 30 (with the LADAR system 10) and a target 32 that may be mobile or stationary relative to the platform 30. Additionally or alternatively, the LADAR system 10 and/or the optional controller 12 may be configured to measure the position (e.g., angular direction) of the target 32 relative to the platform 30. A LADAR system 10 that measures position may be called a tracking LADAR system. A LADAR system 10 that measures distance may be called a ranging LADAR system. The LADAR system 10 is configured to transmit a transmitted signal 22 (also called a LADAR transmitted signal) from the platform 30 with the LADAR transmitter 20 (which also may be referred to as a LADAR illuminator). The transmitted signal 22 is a laser signal and is directed toward the target 32 where the laser signal is reflected, scattered, etc., to return the laser signal as a return signal 36 (also called a LADAR return signal). The LADAR system 10 is configured to receive the return signal 36 with the LADAR receiver 40.

The laser signal emitted from the LADAR system 10 as the transmitted signal 22 and returned from the target 32 as the return signal 36 may be continuous wave, pulsed, and/or intensity modulated. For position measurements, the LADAR system 10 may operate with laser signals with or without time structure (i.e., continuous, pulsed, or modulated laser signals) so long as the LADAR transmitter 20 and the LADAR receiver 40 are configured to transmit and receive a laser signal with sufficient power, wavelength, etc. (including optional time structure) to illuminate the target 32 with the transmitted signal 22 and receive the return signal 36 from the target 32.

For distance measurements, the LADAR system 10 and/or the optional controller 12 are configured to emit and/or impose a time structure in the laser signal (i.e., the laser signal is pulsed, modulated etc.) and to utilize the time structure to determine distance via the time delay between when the transmitted signal 22 was transmitted from the LADAR system 10 and when the return signal 36 was received by the LADAR system 10. Additionally, the LADAR transmitter 20 and the LADAR receiver 40 are configured to transmit and receive a laser signal with sufficient power, wavelength, etc. (including optional time structure) to illuminate the target 32 with the transmitted signal 22 and receive the return signal 36 from the target 32.

The LADAR system 10 and/or the optional controller 12 may be configured to determine the time delay between the transmission of the transmitted signal 22 (when it was transmitted) and the reception of the return signal 36 (when it was received). The time delay indicates (i.e., is related to) the distance between the platform and the target. The distance is the speed of light (in the medium between the platform and the target) times half of the time delay (one half because the signal travels to the target and back, therefore covering twice the distance). The speed of light in air is about $3 \cdot 10^8$ m/s (meters per second) and about 0.3 meters per nanosecond (ns). Therefore, a laser signal travelling from the platform 30 to a target 32 about 300 m from the platform 30 and then returning to the platform 30 would have a time delay of about 2,000 ns. The controller 12 may be configured to determine a distance based upon a measured time delay.

Though the examples may specify and/or imply air as the medium between the target and the platform, the medium may be air, water, space, or any optically transparent medium (e.g., with significant transmission within at least a subset of the range of 150-20,000 nm (nanometers), e.g., 150-11,000 nm, 150-3,500 nm, or 250-3,500 nm). For example, a LADAR system 10 on a satellite may transmit the LADAR signal through a medium that includes regions of space, various densities of atmosphere, and/or water. As another example, a LADAR system 10 on an aircraft or watercraft may transmit the LADAR signal primarily through the ocean.

The LADAR transmitter 20 is configured to emit the transmitted signal 22. The LADAR transmitter 20 may include a laser 28. The laser 28 may be configured to produce a laser signal that is pulsed and/or intensity modulated. Additionally or alternatively, the laser 28 may be configured to produce a continuous wave laser signal. Further, the LADAR transmitter 20 may be configured to optically and/or electronically pulse and/or modulate the laser signal (e.g., configured to modulate a pulsed or continuous wave laser signal). The laser 28 generally is high-powered and configured to travel the distance to and from the target in the medium between the platform and the target. The laser 28 may include, and/or may be, for example, a solid state laser, a diode laser, a gas laser, a chemical laser, a dye laser, an excimer laser, a diode pumped alkali vapor laser, and/or a chemical oxygen iodine laser.

The LADAR transmitter 20 and/or the laser 28 are configured to produce light (e.g., ultraviolet light, visible light, and/or infrared light) in a relatively narrow band (or bands). That is, the transmitted signal 22 has a center wavelength and a linewidth (emission band) that are at optical wavelengths (and optical frequencies). For example, the center wavelength of the transmitted signal may be between 150-20,000 nm, e.g., about 532 nm, 1,064 nm, and/or 1,550 nm. The LADAR transmitter 20 may include more than one laser 28. The LADAR transmitter 20 and/or the laser 28 may be configured to produce light with more than one center wavelength (each with an associated linewidth). As used herein, the linewidth is the full width at half maximum (FWHM) of the transmitted signal 22.

The selection of center wavelength may be application specific. The medium, as well as the expected distance, between the target and platform may indicate suitable wavelengths. Both scattering and absorption of the medium may be a consideration. For transmission in the atmosphere (e.g., for airborne targets), blue and ultraviolet light tends to scatter more than red and infrared light. Additionally, the atmosphere significantly attenuates light in various bands, leaving 'windows' of transmission (e.g., the visible transmission window, and several infrared water transmission windows). For transmission in water (e.g., for underwater targets), visible light generally has greater transmission relative to ultraviolet and infrared light. Additionally, some wavelengths of light are not transmitted to the retina of the eye and so the LADAR system 10 using such wavelengths may be simpler to make 'eye safe' and/or may operate at higher power while remaining 'eye safe.' For example, wavelengths over about 1,400 nm are not significantly transmitted through the human eye to the retina.

The LADAR transmitter linewidth (i.e., the linewidth of the transmitted signal 22) may be relatively narrow, for example, being less than 10 pm (picometers), less than 3 pm, less than 1 pm, less than 0.3 pm, or less than 0.1 pm. Additionally, linewidth may be expressed in units of frequency. The linewidth in frequency units is $$\delta f = \frac{c \cdot \delta \lambda}{\lambda^2}$$

where $\delta f$ is the linewidth in frequency units, c is the speed of light, $\delta \lambda$ is the linewidth in wavelength units, and $\lambda$ is the wavelength. Thus, the LADAR transmitter linewidth may be less than 1 GHz (gigahertz), less than 300 MHz (megahertz), less than 100 MHz, less than 30 MHz, or less than 10 MHz. The LADAR transmitter linewidth generally is a property of the quality of the laser cavity and/or external filters. A smaller linewidth indicates a more pure transmitted signal 22 (fewer optical modes).

The LADAR system 10, the LADAR transmitter 20, and/or the optional controller 12 may be configured to direct the transmitted signal 22 toward the target 32 and may be configured to reflect and/or scatter the transmitted signal 22 from the target 32 to produce the return signal 36. The LADAR system 10 and/or the LADAR transmitter 20 may be oriented to direct the transmitted signal 22 toward the target 32.

The LADAR system 10 may include an optional optical system 60 that is configured to direct the transmitted signal 22 toward the target 32 and/or to collect light from the target 32 (i.e., the return signal 36 and/or other light emanating from the target 32 and/or from the direction of the target 32). The optical system 60 may include a common path for the transmitted signal 22 and the return signal 36, and/or may be configured to keep the transmitted signal 22 separate from the return signal 36. The optical system 60 may include a telescope/beam expander to change the size of the laser beam emitted by the LADAR transmitter 20, for example, to produce a larger transmitted signal beam configured to intercept the target 32, and/or to produce a line or sheet of light configured to intercept the target 32 at a range of locations on the target 32. The optical system 60 may include collection optics such as a telescope to collect return light from a particular direction and/or volume. The optical system 60 may include scanning optics to direct the laser beam toward the target 32 and/or to direct the collection optics toward the target 32. Where the optical system 60 includes controlled components (such as scanning optics and focusing optics), the controller 12 may be configured to control the controlled components.

The LADAR receiver 40 is configured to detect the return signal 36. The LADAR receiver 40 may include a photodetector 50 configured to detect the return signal 36. The photodetector 50 is an electronic detector sensitive to photons generally described as light (e.g., ultraviolet light, visible light, and infrared light). The photodetector 50 generally is sensitive to wavelengths of electromagnetic energy corresponding to the emission wavelengths of the LADAR system 10. For example, the photodetector 50 may be sensitive to wavelengths within the range of 150-20,000 nm, e.g., to a band of light near and/or including 532 nm, 1,064 nm, and/or 1,550 nm. The photodetector 50 may be responsive to high frequency events such as the pulsing and/or intensity modulation of the transmitted signal 22. Additionally or alternatively, the LADAR receiver 40 may be configured to optically mix the return signal 36 and a portion of the transmitted signal 22, or a signal related to the transmitted signal 22, to create a lower frequency signal detected by the photodetector 50 (e.g., with an optical heterodyne technique). The photodetector 50 may be a single point detector, an array detector, and/or an imaging detector. Examples of photodetectors 50 include photomultiplier tubes, avalanche photodiodes, photodiodes, CCD (charge coupled devices), and/or CMOS sensors (complementary metal oxide semiconductor sensors). Photodetectors 50 may be configured for low light detection and/or single photon detection.

The dynamic receiver filter 42 of the LADAR receiver 40 is configured to filter the return signal 36 before the return signal 36 is detected by the photodetector 50. Generally, the LADAR system 10 is operated in the open environment. The target 32 generally is illuminated with ambient light such as sunlight. Further, ambient light may be scattered and/or reflected from other objects, such as air molecules and/or reflective surfaces. Hence, the LADAR receiver 40 may receive significant amounts of ambient light coming from approximately the same direction as the return signal 36. At the LADAR receiver 40, such ambient light is received in conjunction with the return signal 36. The dynamic receiver filter 42 is configured to substantially transmit the return signal 36 while substantially blocking (rejecting) ambient light mingled (mixed) with the return signal 36. The dynamic filter 42 may include one or more dynamic filter elements 52 as discussed herein.

Though the dynamic receiver filter 42 is discussed in terms of transmitting the return signal 36 and the return signal 36 is discussed as passing through the dynamic receiver filter 42, the dynamic receiver filter 42 may be configured to transmit and/or reflect the return signal 36 in the process of filtering the return signal 36. Hence, a reference to transmission with respect to the dynamic receiver filter 42 may be a reference to transmission and/or reflection. For example, transmitting the return signal 36 may be referred to as transmitting and/or reflecting. The transmission spectrum of the dynamic receiver filter 42 may be referred to as the transmission spectrum and/or the reflection spectrum. And, passing the return signal 36 through the dynamic receiver filter 42 may be referred to as traversing the dynamic receiver filter 42 by transmitting and/or reflecting the return signal 36. Therefore, the dynamic receiver filter 42 may be referred to as a transmission filter and/or a reflection filter. Each of the dynamic receiver filter elements 52 may be configured to transmit and/or to reflect the return signal 36 while blocking (reflecting, absorbing, and/or transmitting) other light. The dynamic receiver filter elements 52 may be referred to as transmission filters and/or reflection filters.

The target 32 may be a mobile structure such as an aircraft, a spacecraft, a satellite, a missile, a land vehicle, and a watercraft, or may be a stationary structure such as terrain, a mast, frame, building, etc. Further, the target 32 may include components that move (and that may move at high velocity) relative to the rest of the target 32. For example, the target may include, and/or may be, a turbine, a propeller, and/or a rotor.

Where at least a component of the target 32 is moving relative to the platform 30, the return signal 36 generally is received by the LADAR receiver 40 with a Doppler shift (also called a Doppler offset) relative to the transmitted signal 22 as transmitted from the LADAR transmitter 20. The Doppler effect changes the wavelength and frequency of the received light according to the relative target velocity 34 (the velocity of the target 32 relative to the platform 30) as measured in the direction between the platform 30 and the target 32. The relative target velocity may be due to linear and/or rotational motion of the target, and/or a component thereof, relative to the platform 30. The dynamic receiver filter 42 is tunable and configured to be tuned (adjusted) such that the dynamic receiver filter 42 transmits the return signal 36 even when the return signal 36 is Doppler shifted.

Figure 2:
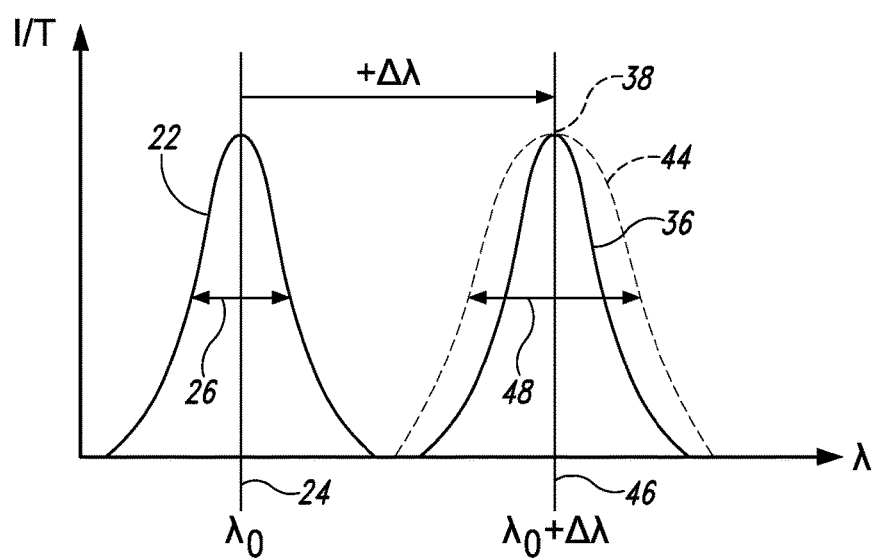
FIG. 2 is an illustration of the spectra of a transmitted LADAR signal, a Doppler-shifted return signal, and a dynamic receiver filter configured to accept the Doppler-shifted return signal.

FIG. 2 illustrates spectra related to the LADAR system 10 of FIG. 1. More specifically, FIG. 2 illustrates (a) the spectrum of the transmitted signal 22, (b) the spectrum of the return signal 36 returned from the target 32 moving with relative target velocity 34, as received by the LADAR receiver 40, and (c) the transmission spectrum 44 of the dynamic receiver filter 42 (also called the dynamic receiver filter pass band) when the dynamic receiver filter 42 is adjusted to pass the return signal 36. As discussed herein, the dynamic receiver filter 42 may be a transmission filter or a reflection filter. In the case of a reflection filter, the transmission spectrum 44 may be referred to as the reflection spectrum 44 and the illustrated spectrum of the dynamic receiver filter 42 may be the reflection spectrum 44.

As indicated by the spectra of FIG. 2, the LADAR transmitter 20 is configured to emit the transmitted signal 22 with a transmitter center wavelength 24 ($\lambda_o$) and a transmitter linewidth 26 (also called an emission band). The return signal 36 is received by the LADAR receiver 40 with a return center wavelength 38 ($\lambda_o + \Delta\lambda$) and a return bandwidth approximately equal to the transmitter linewidth 26. The return signal 36 is Doppler shifted, with a wavelength shift of $\Delta\lambda$. The dynamic receiver filter 42 is tuned such that the transmission spectrum 44 has a receiver center wavelength 46 that is comparable to the return center wavelength 38 (e.g., within 10 pm of the return center wavelength 38 or about the same as the return center wavelength 38).

The Doppler offset (Δλ) of the return signal 36 received at the LADAR receiver 40 relative to the transmitted signal 22 transmitted by the LADAR transmitter 20 is about twice the transmitter center wavelength 24 ($\lambda_o$) times the relative target velocity 34 (v) divided by a speed of light (c) in the medium that extends between the platform 30 and the target 32:

$$\Delta\lambda \approx \frac{2v\lambda_o}{c}$$

In the formula, the relative target velocity 34 (v) is positive if the target is moving away from the platform and negative if the target is moving toward the platform. That is, the Doppler effect causes the wavelength to become longer (red shift) when the target is moving away from the platform.

Unless otherwise noted, the frequency and wavelength of the laser signal emitted from the LADAR system 10 (i.e., the transmitted signal 22 and the return signal 36) are the frequency and wavelength as perceived from the platform 30. Hence, the transmitted signal 22 is emitted at the same frequency and wavelength (according to an observer on the platform 30) regardless of the velocity of the platform. Similarly, the return signal 36 is received by the LADAR system 10 at a frequency and wavelength dependent only on the velocity of the target relative to the platform (i.e., the relative target velocity 34) and not the velocity of the platform or target alone.

As discussed herein, the dynamic receiver filter 42 has, and/or is tuned to have, a transmission spectrum 44 with a receiver bandwidth 48. As used herein, bandwidths are the FWHM of the associated spectrum. Hence, the receiver bandwidth 48 is the FWHM of the transmission spectrum 44 of the dynamic receiver filter 42. Generally, the receiver bandwidth 48 is relatively narrow and, hence, the dynamic receiver filter 42 may be referred to as a narrow-band dynamic receiver filter 42 and/or as an ultra-narrow-band dynamic receiver filter 42. The receiver bandwidth 48 may be similar or equal to the transmitter linewidth 26. More specifically, the receiver bandwidth 48 may be narrow enough that a large Doppler shift would result in a return signal that would be significantly attenuated when traversing a receiver filter with a center wavelength that is the same as the transmitter center wavelength 24. That is, the receiver bandwidth 48 may be narrow enough to require adjustment (tuning) of the receiver center wavelength 46 to achieve significant transmission of the return signal 36 through the dynamic receiver filter 42.

A large Doppler shift may result from relative target velocities 34 of greater than 100 m/s (about 200 miles per hour), greater than 200 m/s, greater than 500 m/s, greater than 1,000 m/s, greater than 2,000 m/s, or greater than 5,000 m/s. For comparison, the velocity for an object to achieve low Earth orbit is about 6,000-10,000 m/s. In wavelength, a large Doppler shift may be at least 1 pm, at least 3 pm, at least 10 pm, at least 30 pm, or at least 100 pm. In frequency, a large Doppler shift may be at least 100 MHz, at least 300 MHz, at least 1 GHz, at least 3 GHz, or at least 10 GHz.

When the receiver bandwidth 48 is narrow, as described, the receiver bandwidth 48 may be less than the transmitter linewidth 26 plus twice the magnitude (absolute value) of any Doppler shift within a design threshold (such as shifts due to velocities less than 10,000 m/s, less than 5,000 m/s, less than 2,000 m/s, less than 1,000 m/s, less than 500 m/s, less than 200 m/s, or less than 100 m/s). For example, the receiver bandwidth 48 may be about equal to the transmitter linewidth 26, and may be less than 300%, less than 200%, less than 150%, or less than 120% of the transmitter linewidth 26. The receiver bandwidth 48 may be less than the transmitter linewidth 26 plus 30 pm, 10 pm, 3 pm, or 1 pm. In absolute terms, the receiver bandwidth 48 may be less than 50 pm, less than 30 pm, less than 10 pm, less than 3 pm, less than 1 pm, less than 0.3 pm, or less than 0.1 pm. Additionally, bandwidth, like linewidth, may be expressed in terms of frequencies. The receiver bandwidth 48 may be less than the transmitter linewidth 26 plus 10 GHz, 3 GHz, 1 GHz, 300 MHz, or 100 MHz. The receiver bandwidth 48 may be less than 20 GHz, less than 10 GHz, less than 3 GHz, less than 1 GHz, less than 300 MHz, less than 100 MHz, less than 30 MHz, or less than 10 MHz.

Typical bandwidths of receiver filters in conventional LADAR systems are wide enough to accept return signals from stationary and moving targets, even targets moving at high velocities that result in large Doppler shifts (e.g., targets that are aircraft, rotor blades, or missiles). The receiver filters in conventional LADAR systems generally do not have tunable center wavelengths and do not need tunable center wavelengths to accommodate return signals from high velocity targets. In contrast, the receiver bandwidth 48 of the dynamic receiver filter 42 may be narrow enough to require a tunable receiver center wavelength 46. By using a narrower receiver bandwidth 48, the dynamic receiver filter 42 can further limit the ambient light (and other background light) transmitted by the filter (relative to a conventional filter). Thus, by limiting the ambient light transmitted, the dynamic receiver filter 42 may achieve a greater signal to noise figure than a conventional system. Generally, the maximum signal to noise ratio of LADAR system 10 (and LADAR systems in general) is achieved when the receiver bandwidth 48 is about equal to the return bandwidth and the transmitter linewidth 26, and the receiver center wavelength 46 is about equal to the return center wavelength 38 (i.e., the unwanted ambient light is limited only to the band where there is also a return signal 36). Because the transmitter linewidth 26 may be very narrow, the receiver bandwidth 48 may be so narrow as to effectively eliminate all sources of ambient and other background light (noise of the LADAR system 10 and/or the LADAR receiver 40 may be limited by electronic noise rather than optical noise).

If the receiver center wavelength 46 of the dynamic receiver filter 42 is not tuned to the return center wavelength 38 (including any Doppler shift (Δλ) from the transmitter center wavelength 24), the dynamic receiver filter 42 may not transmit, or may suboptimally transmit, the return signal 36. Consequently, the LADAR receiver 40 may not detect the return signal 36 or may detect a weak return signal 36 if the receiver center wavelength 46 is not tuned to the return center wavelength 38. Hence, to detect the return signal 36, to maximize the detection of the return signal 36, and/or to maximize the signal to noise ratio of the detection of the return signal 36, the LADAR receiver 40 and/or the optional controller 12 are configured to adjust the receiver center wavelength 46 to approximately (or about) the return center wavelength 38. The receiver center wavelength 46 may be tunable across a range that includes the maximum and minimum desired Doppler-shifted return wavelengths. For example, the receiver center wavelength 46 may be tunable at least between the transmitter center wavelength 24 minus an offset and the transmitter center wavelength 24 plus the offset, the offset being the magnitude of the desired maximum Doppler offset. The offset may be at least 1 pm, at least 3 pm, at least 10 pm, at least 30 pm, or at least 100 pm.

When the receiver center wavelength 46 is about equal to the return center wavelength 38, the dynamic receiver filter 42 is adjusted such that the receiver bandpass substantially includes the return band of the return signal 36. Generally, the receiver center wavelength 46 is adjusted to be about equal to the return center wavelength 38 or an estimate of the return center wavelength 38 based upon a measurement, an estimate, and/or a determination of the relative target velocity 34. As disclosed herein, the measurement, estimate, and/or determination of the relative target velocity 34 may be inaccurate by several hundred meters per second and, thus, the estimate of the return center wavelength 38 may be inaccurate by several picometers. Whether due to an inaccurate estimate or not, the receiver center wavelength 46 may be adjusted to within 10 pm, within 3 pm, within 1 pm, within 0.3 pm, or within 0.1 pm of the return center wavelength 38.

If the relative target velocity 34 is initially unknown and the receiver center wavelength 46 is not set to the return center wavelength 38, the initial return signal 36 may be rejected by the dynamic receiver filter 42. Therefore, the LADAR system 10 and/or the optional controller 12 may be configured to measure, to estimate, and/or to determine the relative target velocity 34 and, thus, the expected return center wavelength 38 based upon the relative target velocity 34 and the transmitter center wavelength 24 (by calculating the Doppler-shifted return center wavelength 38).

The LADAR system 10 and/or the optional controller 12 may be configured to estimate the relative target velocity 34 by measuring, estimating, and/or determining the velocity of the platform 30 relative to a stationary object or another reference object of known velocity. For example, the LADAR system 10 and/or the optional controller 12 may be configured to treat the stationary object as a target 32 and measure the time delay between the transmitted signal 22 sent and the return signal 36 received. Additionally or alternatively, the LADAR system 10 and/or the optional controller 12 may receive a measurement, estimate, and/or determination of the platform velocity from other sensors such as a GPS (global positioning system) and/or an IMU (inertial measurement unit). Once the platform velocity is known, the relative target velocity 34 may be (at least initially) estimated as stationary and/or the known velocity of the reference object.

Additionally or alternatively, the LADAR system 10 and/or the optional controller 12 may be configured to measure, to estimate, and/or to determine the relative target velocity 34 by combining the platform velocity with other measurements, estimates, and/or determinations of the relative target velocity 34. For example, the platform 30 or another system may include a device to measure the velocity of the target 32, e.g., a conventional LADAR system with a lower signal to noise level (due to a wider receiver filter) than the LADAR system 10. As another example, the LADAR system 10 and/or the optional controller 12 may be configured to adjust the receiver bandwidth 48 of the dynamic receiver filter 42 to be wide enough to accept return signals 36 of any Doppler shift within a design threshold (such as shifts due to velocities less than 20,000 m/s, less than 10,000 m/s, less than 5,000 m/s, less than 2,000 m/s, less than 1,000 m/s, less than 500 m/s, less than 200 m/s, or less than 100 m/s). As yet another example, the LADAR system 10 may include a wider-band receiver filter configured to detect the return signal 36. The LADAR system 10 in these wider bandwidth configurations may be able to detect the return signal 36, albeit at a lower signal to noise level than the LADAR system 10 in the normal configuration with the narrower receiver bandwidth 48.

Further additionally or alternatively, the LADAR system 10 and/or the optional controller 12 may be configured to measure, to estimate, and/or to determine the return center wavelength 38 by changing the receiver center wavelength 46 to search for the return signal 36. The search may include sampling and/or scanning a range of center wavelengths that extends between the minimum expected Doppler-shifted wavelength (maximum velocity travelling toward the platform 30) and the maximum expected Doppler-shifted wavelength (maximum velocity travelling away from the platform 30). The minimum and maximum expected Doppler-shifted wavelengths may be equivalent to Doppler shifts due to velocities less than a design threshold, e.g., velocities less than 20,000 m/s, less than 10,000 m/s, less than 5,000 m/s, less than 2,000 m/s, less than 1,000 m/s, less than 500 m/s, less than 200 m/s, or less than 100 m/s. The search may include a sequential search, a dithered search (testing different center wavelengths until at least a weak signal is found), and an optimization (adjusting the center wavelength to maximize the detected return signal).

The measurement, estimate, and/or determination of the return center wavelength 38 need not be exact. The receiver bandwidth 48 may be wide enough to encompass a range of possible return center wavelengths 38 and return signals 36. Hence, an estimate based upon the platform velocity and/or a noisy target velocity measurement in an alternate LADAR configuration may be sufficient to adjust the receiver center wavelength 46 close enough to the return center wavelength 38 so as to receive a significant return signal 36, even when the estimate is hundreds of meters per second inaccurate. For example, the receiver bandwidth 48 may be about 10 pm and wider than the transmitter linewidth 26 (which may be, e.g., 3 pm). If the estimate of the target velocity is inaccurate by about 500 m/s, the resulting error in the estimated receiver center wavelength 46 would be about 3 pm (the Doppler offset due to 500 m/s) and the dynamic receiver filter 42 would still substantially transmit the return signal 36.

Figure 3:
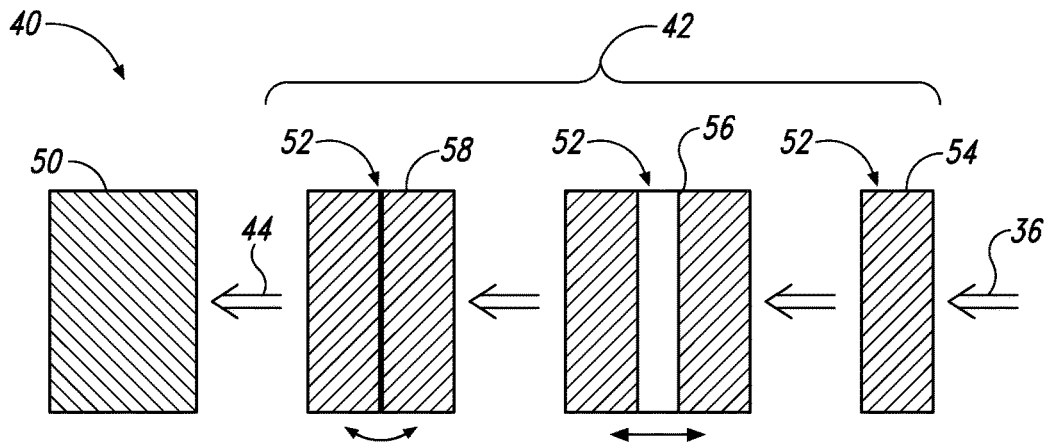
FIG. 3 is a schematic representation of an example of a dynamic receiver filter, illustrating a configuration of elements.

FIG. 3 is an example of a dynamic receiver filter 42 within a LADAR receiver 40, illustrating one potential configuration of dynamic receiver filter elements 52. Generally, dynamic receiver filter elements 52 may be optical elements, each being independently configured to transmit, to reflect, to absorb, to refract, and/or to diffract the return signal 36.

Examples of dynamic receiver filter elements 52 include an optical filter, an optical resonator, an etalon, an air-spaced etalon, a solid etalon, an angle-tuned etalon, a temperature-tuned etalon, a pressure-tuned etalon, a whispering gallery mode resonator, a distributed Bragg grating, a fiber Bragg grating, an absorptive filter, a colored glass filter, an interference filter, a mirror, and a lens. For dynamic receiver filter elements 52 that are configured to filter the light (to transmit and/or to reflect a portion of the incoming light according to the wavelength of the incoming light), the dynamic receiver filter elements 52 each independently may have one or more center wavelengths (e.g., a group of transmission bands), and one or more pass bands (each consisting of a contiguous range of wavelengths transmitted). The dynamic receiver filter elements 52 may include, and/or may be, a short pass filter (substantially transmitting only shorter wavelengths), a long pass filter (substantially transmitting only longer wavelengths), a bandpass filter (substantially transmitting wavelengths only in a range of wavelengths), and/or a comb filter (substantially transmitting wavelengths in a series of wavelength bands or ranges). As with the dynamic receiver filter 42, a reference to transmission, transmitting, etc., with respect to a dynamic receiver filter element 52 may also be a reference to reflection, reflecting, etc.

As shown in FIG. 3, the dynamic receiver filter 42 may include a plurality of dynamic receiver filter elements 52. The transmission spectrum 44 of the dynamic receiver filter 42 may be shaped by the spectra of the individual dynamic receiver filter elements 52. In particular, the spectrum of a combination of filters generally is the product (multiplication) of the spectra of the individual filters of the combination. To achieve tunability in the dynamic receiver filter 42, one or more of the dynamic receiver filter elements 52 may be tunable (i.e., a characteristic wavelength, such as the center wavelength, is configured to be adjusted).

Figure 4:
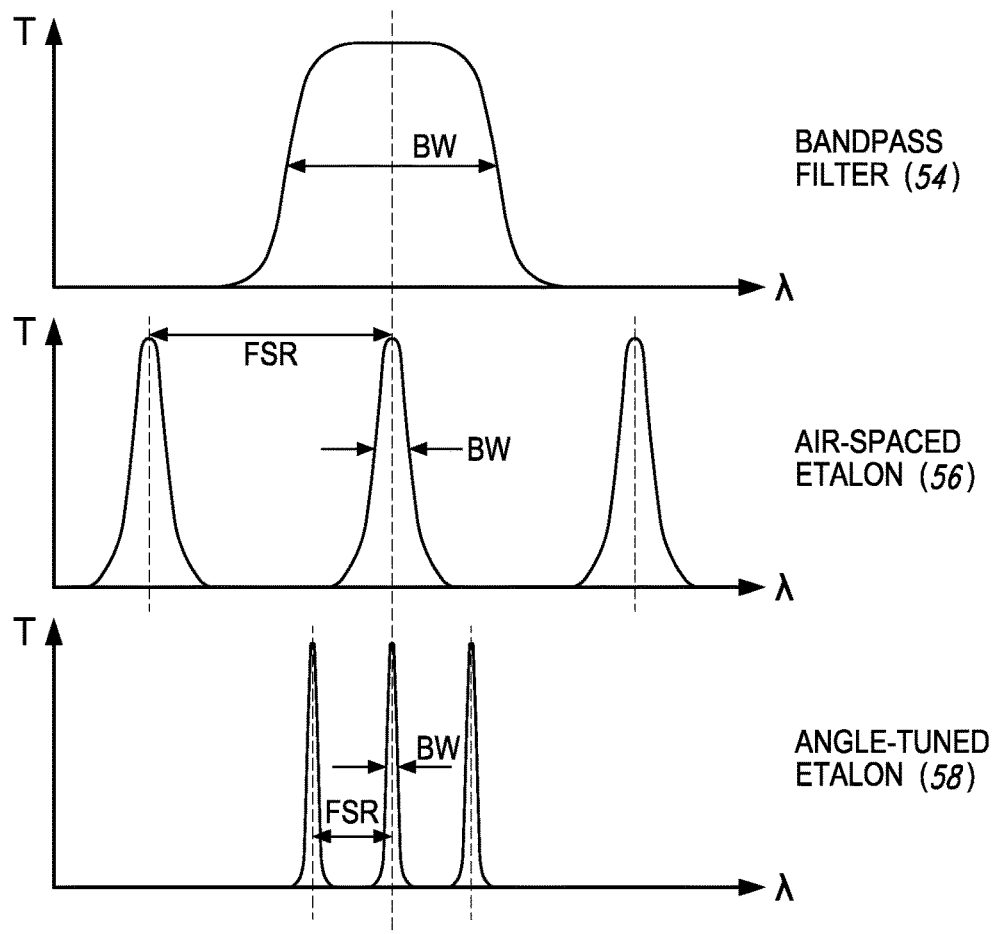
FIG. 4 is an illustration of spectra of various example elements of the dynamic receiver filter of FIG. 3.

In the example of FIG. 3, the dynamic receiver filter 42 includes a series of three dynamic receiver filter elements 52. One is a bandpass filter 54, which is configured to transmit a band of wavelengths that encompasses the receiver center wavelength 46 (as illustrated in FIG. 4). One is an air-spaced etalon 56, which is a comb filter configured to transmit a series of wavelength peaks, one of which encompasses the receiver center wavelength 46. And, one is an angle-tuned etalon 58 (also called a solid etalon), which is also a comb filter configured to transmit a series of wavelength peaks, one of which encompasses the receiver center wavelength 46.

An etalon, also called a Fabry-Pérot etalon and a Fabry-Pérot interferometer, is an optical resonant cavity formed from two closely spaced and aligned (parallel) reflecting surfaces separated by an optical medium. The optical path length (the distance times the index of refraction) between the reflecting surfaces determines the resonance condition and the transmission of light through the etalon. Light is transmitted when its wavelength is twice the optical path length between the reflecting surfaces divided by a positive integer. Etalons typically transmit a series of wavelength peaks and, hence, may be referred to as comb filters. Etalons may be tuned (the location of the peak wavelengths may be adjusted) by adjusting the resonant cavity, for example, by changing the distance between the reflecting surfaces and/or by changing the optical path length between the reflecting surfaces (e.g., by changing the index of refraction and/or the angle of incidence). The distance may be changed by adjusting the spacing of the reflecting surfaces, e.g., via lateral translation, pressure (compressing the medium) and/or temperature (thermal expansion/contraction). The optical path length may be changed, for example, by changing the angle of incidence and/or applying pressure (induced optical index changes). When an etalon is tuned, the center wavelength of each peak is adjusted by approximately the same amount.

Of the three dynamic receiver filter elements 52 in FIG. 3, the bandpass filter 54 is not configured for tunability (having a static center wavelength) and transmits a relatively broad band of wavelengths that is wider than the tunability range of the dynamic receiver filter 42. For example, the bandwidth of the bandpass filter 54 spans the minimum desired Doppler-shifted wavelength and the maximum desired Doppler-shifted wavelength and may be substantially wider. Examples of suitable bandwidths (FWHM) for bandpass filters 54 include less than 10 nm, less than 3 nm, less than 1 nm, less than 300 pm, less than 100 pm, greater than 100 pm, greater than 300 pm, greater than 1 nm, greater than 3 nm, about 10 nm, about 3 nm, and/or about 1 nm.

The air-spaced etalon 56 is tunable by adjusting the air gap between the reflective etalon elements (as indicated by the linear arrow at the base of the element). For example, the air-spaced etalon 56 may be tuned with piezo electric elements. The angle-tuned etalon 58 is tunable by adjusting the angle of incidence of the light (as indicated by the arcuate arrow at the base of the element). For example, the angle-tuned etalon 58 may be tuned by tilting the etalon with respect to the optical axis of the dynamic receiver filter 42.

Each of the dynamic receiver filter elements 52 independently may have pass bands with a bandwidth (FWHM) of less than 10 nm, less than 3 nm, less than 1 nm, less than 300 pm, less than 100 pm, less than 30 pm, less than 10 pm, less than 3 pm, less than 1 pm, less than 0.3 pm, or less than 0.1 pm. Where the bandwidth of one dynamic receiver filter element 52 is about the same as the receiver bandwidth 48 of the dynamic receiver filter 42, any other dynamic receiver filter elements 52 may have larger bandwidths.

As illustrated in FIG. 4, the three dynamic receiver filter elements 52 of FIG. 3 have pass bands that cascade to progressively narrow the transmission through the dynamic receiver filter 42 to achieve the net receiver bandwidth 48 (not shown in FIG. 4) and receiver center wavelength 46. The bandpass filter 54 has a relatively wide bandwidth (BW in FIG. 4), the widest bandwidth of the three dynamic receiver filter elements 52. The bandwidth of the bandpass filter 54 is configured to transmit the return center wavelength 38, to transmit significantly Doppler-shifted wavelengths, and to block (reject) other wavelengths, in particular, the auxiliary transmission peaks of the air-spaced etalon 56 and the angle-tuned etalon 58. Etalons generally transmit a series of peaks. The spacing between the peaks is called the free spectral range (FSR in FIG. 4). The central transmission peaks of the air-spaced etalon 56 and the angle-tuned etalon 58 encompass the return center wavelength 38. The other peaks in the etalon transmission spectra are the auxiliary peaks. Though only three peaks are illustrated, an etalon may transmit many more than three peaks.

In the configuration of FIGS. 3 and 4, the bandwidth of the bandpass filter 54 is configured to be less than the free spectral range of the air-spaced etalon. Thus, the combination of the bandpass filter 54 and the air-spaced etalon 56 transmits just one peak of the air-spaced etalon 56, the center peak in FIG. 4.

The air-spaced etalon 56 is configured to be tuned, to adjust the center wavelength of the peak transmitted by the bandpass filter 54. The center wavelength of the air-spaced etalon 56 may be adjusted between a minimum Doppler-shifted wavelength (corresponding to a maximum target velocity toward the platform) and a maximum Doppler-shifted wavelength (corresponding to a maximum target velocity away from the platform). The center wavelength of the transmitted peak of the air-spaced etalon 56 generally is set to approximately the return center wavelength 38.

The bandwidth of the air-spaced etalon 56 is configured to be less than the free spectral range of the angle-tuned etalon. Thus, the combination of the air-spaced etalon 56 and the angle-tuned etalon 58 transmits one peak of the angle-tuned etalon 58, the center peak in FIG. 4. Other transmission peaks of the air-spaced etalon 56 and the angle-tuned etalon 58 also may overlap, but outside of the bandwidth of the bandpass filter 54. Thus, the combination of the bandpass filter 54, the air-spaced etalon 56, and the angle-tuned etalon 58 transmits just one peak of the angle-tuned etalon 58, the center peak in FIG. 4.

The angle-tuned etalon 58 is configured to be tuned, to adjust the center wavelength of the peak that also is transmitted by the bandpass filter 54 and the air-spaced etalon 56. The center wavelength of the angle-tuned etalon 58 may be adjusted between the minimum and maximum Doppler-shifted wavelengths as described with respect to the air-spaced etalon 56. However, the angle-tuned etalon 58 does not need to be configured to tune a single peak over the entire range between the minimum and maximum Doppler-shifted wavelengths and may be configured to tune the center wavelength over the free spectral range of the angle-tuned etalon 58. Hence, one of the peaks (e.g., the center peak) may be tuned to transmit some return center wavelengths 38 (e.g., shorter wavelengths) and another of the peaks (e.g., the right peak) may be tuned to transmit some other return center wavelengths 38 (e.g., longer wavelengths). The center wavelength of the transmitted peak of the angle-spaced etalon 58 generally is set to approximately the return center wavelength 38, e.g., about equal to the return center wavelength 38. The bandwidth of the angle-tuned etalon 58 is substantially the bandwidth of the dynamic receiver filter 42 (i.e., the receiver bandwidth 48).

Though the example of FIGS. 3 and 4 presents the bandpass filter 54 encountering the incoming return signal 36 first, the order of the dynamic receiver filter elements 52 may be selected according to the specific application. For example, the filtering performance of the example of FIGS. 3 and 4 would be unaffected by the order of the specific dynamic receiver filter elements 52. But, locating the bandpass filter 54 first in the incoming return signal path may have the advantage of rejecting much of the ambient light before entering the dynamic receiver filter 42 and, consequently, may reduce the likelihood that internally scattered ambient light may bypass one of the dynamic receiver filter elements 52 and be detected by the photodetector 50.

Figure 5:
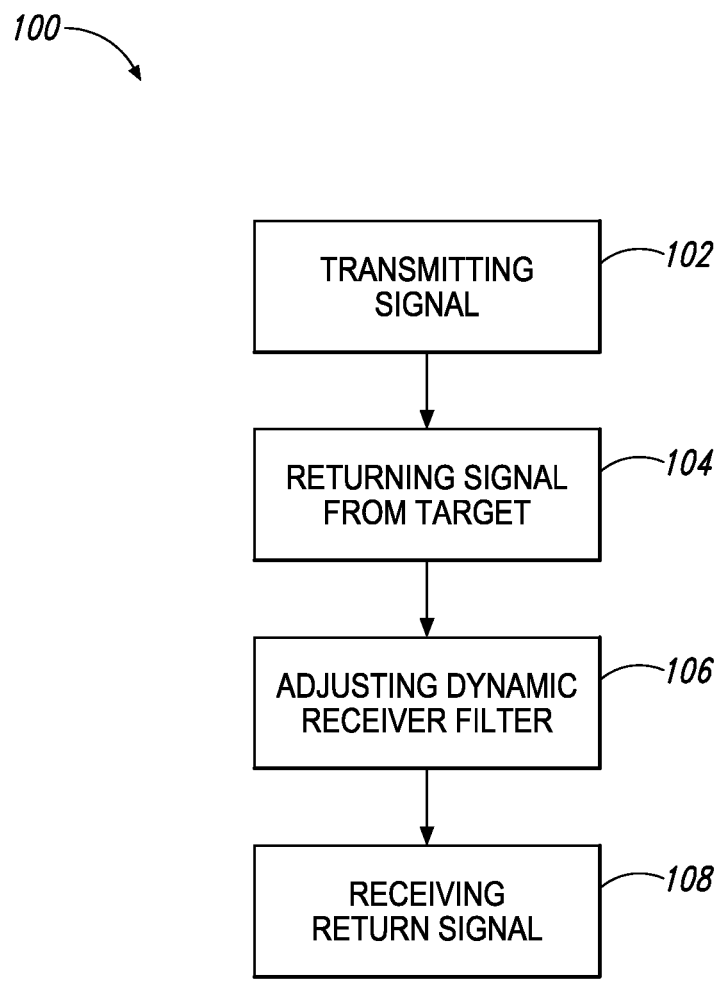
FIG. 5 is a schematic representation of methods of using a LADAR system with a dynamic receiver filter.

FIG. 5 schematically represents methods 100 of detecting a LADAR signal. Methods 100 include transmitting 102 a laser signal (e.g., the transmitted signal 22) from a platform, returning 104 the laser signal (e.g., as the return signal 36) from a target that is moving relative to the platform, adjusting 106 a dynamic receiver filter (such as dynamic receiver filter 42) to a receiver center wavelength that is based upon the center wavelength of the laser signal returned (e.g., the return center wavelength 38), and receiving 108 the laser signal returned from the target through the dynamic receiver filter adjusted to the receiver center wavelength.

Transmitting 102 may include transmitting with the LADAR transmitter 20 and/or the LADAR system 10 as discussed. The laser signal is transmitted with a transmitter center wavelength (e.g., the transmitter center wavelength 24) and a transmitter linewidth (e.g., the transmitter linewidth 26). For example, the laser signal may have a transmitter linewidth that is narrower than the Doppler offset of the laser signal returned from the moving target.

Returning 104 may include reflecting and/or scattering the laser signal off of the target. When the laser signal is returned from the target, the target is moving with a target velocity relative to the platform, as measured in the direction between the platform and the target. Returning 104 may include directing the laser signal toward the target, for example, with the LADAR system 10, the LADAR transmitter 20, and/or the optical system 60. The laser signal returned from the target is Doppler shifted due to the relative velocity of the target. The return center wavelength is offset relative the transmitter center wavelength by the Doppler offset as discussed herein.

Adjusting 106 may include measuring, estimating, and/or determining the relative target velocity. As discussed herein, measuring, estimating, and/or determining may include measuring, estimating, and/or determining the velocity of the platform and/or the velocity of the target. Adjusting 106 may include measuring, estimating, and/or determining the Doppler offset due to the relative target velocity and that measurement, estimation, and/or determination of the Doppler offset may be based upon the measurement, estimation, and/or determination of the platform velocity, the target velocity, and/or the relative target velocity (relative to the platform).

Adjusting 106 may include adjusting the receiver center wavelength to be about equal to the return center wavelength, e.g., within 10 pm, within 3 pm, within 1 pm, within 0.3 pm, or within 0.1 pm of the return center wavelength. Adjusting 106 may include adjusting the receiver center wavelength to be about equal to the sum of the transmitter center wavelength and the Doppler offset (e.g., the measured, estimated, and/or determined Doppler offset).

Adjusting 106 may include changing the receiver center wavelength to search for the return signal. The searching may include sampling and/or scanning a range of center wavelengths that extends between the minimum expected Doppler-shifted wavelength (maximum velocity travelling toward the platform) and the maximum expected Doppler-shifted wavelength (maximum velocity travelling away from the platform). The minimum and maximum expected Doppler-shifted wavelengths may be equivalent to Doppler shifts due to velocities less than a design threshold, e.g., velocities less than 20,000 m/s, less than 10,000 m/s, less than 5,000 m/s, less than 2,000 m/s, less than 1,000 m/s, less than 500 m/s, less than 200 m/s, or less than 100 m/s. The searching may include a sequential search (e.g., serially changing the center wavelength until at least a weak signal is found), a dithered search (serially testing different center wavelengths until at least a weak signal is found), and an optimization (adjusting the center wavelength to maximize the detected return signal). Generally, the searching may include changing the center wavelength of the dynamic receiver filter to two or more values, measuring the intensity of the laser signal returned from the target through the dynamic receiver filter at each of the values of the center wavelength, and adjusting the receiver center wavelength to the center wavelength corresponding to a maximum of the intensities.

Receiving 108 the laser signal returned from the target through the dynamic receiver filter adjusted to the receiver center wavelength may include filtering the returned laser signal with the dynamic receiver filter to reject ambient light mingled (mixed) with the returned laser signal. Receiving 108 may include detecting the returned laser signal (e.g., as filtered by the dynamic receiver filter) to determine a distance between the platform and the target. Additionally or alternatively, methods 100 may include determining a distance between the platform and the target based at least in part on the laser signal transmitted to the target and the laser signal returned from the target.

Further, methods 100 may be repeated, for example, tracking a target and/or receiving a returned laser signal from multiple targets. Repeating of methods 100 may include repeating one or more of transmitting 102, returning 104, adjusting 106, and receiving 108 with the same target at different times and/or with a plurality of targets in different locations (e.g., different directions and/or distances from the platform). In such circumstances, the laser signals returned from the target(s) may be referred to as a series of laser signals. Adjusting 106 may include repeatedly adjusting the receiver center wavelength for each of the series of laser signals and/or for select laser signals. Adjusting 106 may include adjusting the receiver center wavelength at the beginning of the series of laser signals and/or may include adjusting the receiver center wavelength while receiving the series of laser signals (at least partially concurrently). Where a target (and/or the platform) changes velocity while being tracked, adjusting 106 the receiver center wavelength while the target is being tracked helps to maintain a high signal to noise ratio (high transmission of the return signal and low transmission of ambient light). To facilitate adjusting for different laser signals, adjusting 106 (e.g., adjusting for the first of the laser signals) may include recording the receiver center wavelength. Adjusting 106 for other laser signals at a later time may include setting the receiver center wavelength to the recorded center wavelength.

Examples of inventive subject matter according to the present disclosure are described in the following enumerated paragraphs.

A1. A method of detecting a LADAR signal, the method comprising:
  transmitting a laser signal from a platform, wherein the laser signal has a transmitter center wavelength and a transmitter linewidth;
  returning the laser signal from a target that is moving relative to the platform with a target velocity by directing the laser signal toward the target, wherein the target velocity is a relative velocity of the target relative to the platform in a direction between the platform and the target, and wherein the laser signal returned from the target has a return center wavelength that is offset relative to the transmitter center wavelength by a Doppler offset due to the target velocity;
  adjusting a dynamic receiver filter to a receiver center wavelength that is based upon the return center wavelength;
  filtering the laser signal returned from the target with the dynamic receiver filter to reject ambient light mingled with the laser signal returned from the target and to produce a filtered laser signal; and
  detecting the filtered laser signal to determine a distance between the platform and the target.

A2. The method of paragraph A1, wherein the adjusting includes at least one of measuring, estimating, or determining the target velocity, optionally based upon at least one of measuring, estimating, or determining a velocity of the platform.

A3. The method of any of paragraphs A1-A2, wherein the adjusting includes at least one of measuring, estimating, or determining the Doppler offset, optionally based upon at least one of measuring, estimating, or determining a velocity of the platform.

A4. The method of any of paragraphs A1-A3, wherein the adjusting includes adjusting the receiver center wavelength to about equal to the return center wavelength.

A5. The method of any of paragraphs A1-A4, wherein the adjusting includes adjusting the receiver center wavelength to within 10 pm, within 3 pm, within 1 pm, within 0.3 pm, or within 0.1 pm of the return center wavelength.

A6. The method of any of paragraphs A1-A5, wherein the adjusting includes adjusting the receiver center wavelength to about equal to a sum of the transmitter center wavelength and the Doppler offset.

A7. The method of any of paragraphs A1-A6, wherein the Doppler offset is about twice the transmitter center wavelength times the target velocity divided by a speed of light in a medium between the platform and the target.

A8. The method of any of paragraphs A1-A7, wherein the adjusting includes serially changing a center wavelength of the dynamic receiver filter to two or more values, measuring an intensity of the laser signal returned from the target through the dynamic receiver filter at each of the values of the center wavelength, and adjusting the receiver center wavelength to the center wavelength corresponding to a maximum of the intensities.

A8.1. The method of paragraph A8, wherein the serially changing includes dithering the center wavelength within a range of values between a maximum Doppler-shifted wavelength and a minimum Doppler-shifted wavelength.

A8.2. The method of any of paragraphs A8-A8.1, wherein the serially changing includes scanning the center wavelength between a maximum Doppler-shifted wavelength and a minimum Doppler-shifted wavelength.

A9. The method of any of paragraphs A1-A8.2, wherein the adjusting includes recording the receiver center wavelength as a recorded center wavelength, wherein the method includes repeating the transmitting, the returning, the adjusting, the filtering, and the detecting at a later time, and wherein the adjusting at the later time includes setting the receiver center wavelength to the recorded center wavelength.

A10. The method of any of paragraphs A1-A9, wherein the transmitter linewidth is less than 30 pm, less than 10 pm, less than 3 pm, less than 1 pm, less than 0.3 pm, or less than 0.1 pm.

A11. The method of any of paragraphs A1-A10, wherein the transmitter center wavelength is between 150 nm and 20,000 nm, between 150 nm and 11,000 nm, between 150 nm and 3,500 nm, and/or between 250 nm and 3,500 nm.

A12. The method of any of paragraphs A1-A11, wherein the transmitter center wavelength is selected from the group consisting of about 532 nm, about 1064 nm, and about 1550 nm.

A13. The method of any of paragraphs A1-A12, wherein the platform is at least one of an aircraft, a spacecraft, a satellite, a missile, a land vehicle, or a watercraft.

A14. The method of any of paragraphs A1-A13, wherein the dynamic receiver filter has a receiver bandwidth that is less than the transmitter linewidth plus twice a magnitude of the Doppler offset.

A14.1. The method of paragraph A14, wherein the receiver bandwidth is about equal to the transmitter linewidth.

A14.2. The method of any of paragraphs A14-A14.1, wherein the receiver bandwidth is less than 300%, less than 200%, less than 150%, or less than 120% of the transmitter linewidth.

A14.3. The method of any of paragraphs A14-A14.2, wherein the receiver bandwidth is less than the transmitter linewidth plus 30 pm, 10 pm, 3 pm, or 1 pm.

A14.4. The method of any of paragraphs A14-A14.3, wherein the receiver bandwidth is less than 50 pm, less than 30 pm, less than 10 pm, less than 3 pm, less than 1 pm, less than 0.3 pm, or less than 0.1 pm.

A15. The method of any of paragraphs A1-A14.4, wherein a magnitude of the Doppler offset is at least 1 pm, at least 3 pm, at least 10 pm, at least 30 pm, or at least 100 pm.

A16. The method of any of paragraphs A1-A15, wherein the receiver center wavelength is tunable at least between the transmitter center wavelength minus an offset and the transmitter center wavelength plus the offset, and wherein the offset is at least 1 pm, at least 3 pm, at least 10 pm, at least 30 pm, or at least 100 pm.

A17. The method of any of paragraphs A1-A16, wherein the dynamic receiver filter includes, optionally is, at least one of a transmission filter or a reflection filter.

A18. The method of any of paragraphs A1-A17, wherein the dynamic receiver filter includes a dynamic receiver filter element.

A18.1. The method of paragraph A18, wherein the dynamic receiver filter element includes, optionally is, at least one of an optical resonator, an etalon, an air-spaced etalon, a solid etalon, an angle-tuned etalon, a temperature-tuned etalon, a pressure-tuned etalon, a whispering gallery mode resonator, a distributed Bragg grating, a fiber Bragg grating, an absorptive filter, a colored glass filter, or an interference filter.

A18.2. The method of any of paragraphs A18-A18.1, wherein the dynamic receiver filter element includes, optionally is, at least one of a short pass filter, a long pass filter, a bandpass filter, or a comb filter.

A18.3. The method of any of paragraphs A18-A18.2, wherein the dynamic receiver filter element includes, optionally is, at least one of a transmission filter or a reflection filter.

A18.4. The method of any of paragraphs A18-A18.3, wherein the dynamic receiver filter element has a tunable center wavelength.

A18.5. The method of any of paragraphs A18-A18.4, wherein the dynamic receiver filter element has a FWHM of about a/the receiver bandwidth.

A18.6. The method of any of paragraphs A18-A18.5, wherein the dynamic receiver filter element has a FWHM of less than 10 nm, less than 3 nm, less than 1 nm, less than 300 pm, less than 100 pm, less than 30 pm, less than 10 pm, less than 3 pm, less than 1 pm, less than 0.3 pm, or less than 0.1 pm.

A18.7. The method of any of paragraphs A18-A18.6, wherein the dynamic receiver filter element has a tunable center wavelength that is tunable between the transmitter center wavelength minus an offset and the transmitter center wavelength plus the offset, and wherein the offset is at least 1 pm, at least 3 pm, at least 10 pm, at least 30 pm, or at least 100 pm.

A19. The method of any of paragraphs A1-A18.7, wherein a magnitude of the target velocity is at least 100 m/s, at least 300 m/s, or at least 1,000 m/s.

A20. The method of any of paragraphs A1-A19, wherein the laser signal returned from the target is at least one of reflected from the target or scattered by the target.

A21. The method of any of paragraphs A1-A20, further comprising determining the distance between the platform and the target based at least in part on the laser signal transmitted to the target and the laser signal returned from the target.

B1. A LADAR system comprising:
a LADAR transmitter configured to emit a laser signal from a platform, wherein the laser signal has a transmitter center wavelength and a transmitter linewidth, wherein the transmitter linewidth is less than 30 pm, and wherein the LADAR system is configured to cause the laser signal to return from a target that is moving relative to the platform with a target velocity of at least 100 m/s, wherein the target velocity is a relative velocity of the target relative to the platform in a direction between the platform and the target; and
a LADAR receiver configured to detect the laser signal returning from the target, wherein the LADAR receiver includes a dynamic receiver filter with a receiver center wavelength and a receiver bandwidth, wherein the receiver bandwidth is less than the transmitter linewidth plus 30 pm, wherein the LADAR receiver is configured to adjust the receiver center wavelength to a sum of the transmitter center wavelength and a Doppler offset due to the target velocity.

B2. The LADAR system of paragraph B1, wherein the transmitter linewidth is less than 10 pm, less than 3 pm, less than 1 pm, less than 0.3 pm, or less than 0.1 pm.

B3. The LADAR system of any of paragraphs B1-B2, wherein the LADAR transmitter includes a laser.

B4. The LADAR system of any of paragraphs B1-B3, wherein the transmitter center wavelength is between 150 nm and 20,000 nm, between 150 nm and 11,000 nm, between 150 nm and 3,500 nm, and/or between 250 nm and 3,500 nm.

B5. The LADAR system of any of paragraphs B1-B4, wherein the transmitter center wavelength is selected from the group consisting of about 532 nm, about 1064 nm, and about 1550 nm.

B6. The LADAR system of any of paragraphs B1-B5, wherein the platform is at least one of an aircraft, a spacecraft, a satellite, a missile, a land vehicle, or a watercraft.

B7. The LADAR system of any of paragraphs B1-B6, wherein the receiver bandwidth is about equal to the transmitter linewidth.

B8. The LADAR system of any of paragraphs B1-B7, wherein the receiver bandwidth is less than 300%, less than 200%, less than 150%, or less than 120% of the transmitter linewidth.

B9. The LADAR system of any of paragraphs B1-B8, wherein the receiver bandwidth is less than the transmitter linewidth plus 10 pm, 3 pm, or 1 pm.

B10. The LADAR system of any of paragraphs B1-B9, wherein the receiver bandwidth is less than 50 pm, less than 30 pm, less than 10 pm, less than 3 pm, less than 1 pm, less than 0.3 pm, or less than 0.1 pm.

B11. The LADAR system of any of paragraphs B1-B10, wherein a magnitude of the Doppler offset is at least 1 pm, at least 3 pm, at least 10 pm, at least 30 pm, or at least 100 pm.

B12. The LADAR system of any of paragraphs B1-B11, wherein the receiver center wavelength is tunable at least between the transmitter center wavelength minus an offset and the transmitter center wavelength plus the offset, and wherein the offset is at least 1 pm, at least 3 pm, at least 10 pm, at least 30 pm, or at least 100 pm.

B13. The LADAR system of any of paragraphs B1-B12, wherein the dynamic receiver filter includes, optionally is, at least one of a transmission filter or a reflection filter.

B14. The LADAR system of any of paragraphs B1-B13, wherein the dynamic receiver filter includes a dynamic receiver filter element.

B14.1. The LADAR system of paragraph B14, wherein the dynamic receiver filter element includes, optionally is, at least one of an optical resonator, an etalon, an air-spaced etalon, a solid etalon, an angle-tuned etalon, a temperature-tuned etalon, a pressure-tuned etalon, a whispering gallery mode resonator, a distributed Bragg grating, a fiber Bragg grating, an absorptive filter, a colored glass filter, or an interference filter.

B14.2. The LADAR system of any of paragraphs B14-B14.1, wherein the dynamic receiver filter element includes, optionally is, at least one of a short pass filter, a long pass filter, a bandpass filter, or a comb filter.

B14.3. The LADAR system of any of paragraphs B14-B14.2, wherein the dynamic receiver filter element includes, optionally is, at least one of a transmission filter or a reflection filter.

B14.4. The LADAR system of any of paragraphs B14-B14.3, wherein the dynamic receiver filter element has a tunable center wavelength.

B14.5. The LADAR system of any of paragraphs B14-B14.4, wherein the dynamic receiver filter element has a FWHM of about the receiver bandwidth.

B14.6. The LADAR system of any of paragraphs B14-B14.5, wherein the dynamic receiver filter element has a FWHM of less than 10 nm, less than 3 nm, less than 1 nm, less than 300 pm, less than 100 pm, less than 30 pm, less than 10 pm, less than 3 pm, less than 1 pm, less than 0.3 pm, or less than 0.1 pm.

B14.7. The LADAR system of any of paragraphs B14-B14.6, wherein the dynamic receiver filter element has a tunable center wavelength that is tunable between the transmitter center wavelength minus an offset and the transmitter center wavelength plus the offset, and wherein the offset is at least 1 pm, at least 3 pm, at least 10 pm, at least 30 pm, or at least 100 pm.

B14.8. The LADAR system of any of paragraphs B14-B14.7, wherein the dynamic receiver filter includes a first dynamic receiver filter element and a second dynamic receiver filter element, and wherein a FWHM of the first dynamic receiver filter element is greater than a FWHM of the second dynamic receiver filter element.

B14.8.1. The LADAR system of paragraph B14.8, wherein the first dynamic receiver filter element has a static center wavelength and the second dynamic receiver filter element has a tunable center wavelength.

B14.8.2. The LADAR system of any of paragraphs B14.8-614.8.1, wherein the dynamic receiver filter includes a third dynamic receiver filter element, wherein a FWHM of the third dynamic receiver filter element is less than the FWHM of the second dynamic receiver filter element, and optionally wherein the third dynamic receiver filter element has a tunable center wavelength.

B15. The LADAR system of any of paragraphs B1-614.8.2, wherein the target velocity is at least 300 m/s or at least 1,000 m/s.

B16. The LADAR system of any of paragraphs B1-B15, wherein the LADAR system is configured to direct the laser signal to the target.

B17. The LADAR system of any of paragraphs B1-B16, wherein the LADAR system is configured to reflect and/or scatter the laser signal from the target.

B18. The LADAR system of any of paragraphs B1-B17, wherein the LADAR system is configured to receive the laser signal returning form the target.

B19. The LADAR system of any of paragraphs B1-B18, wherein the LADAR receiver includes a photodetector configured to detect the laser signal returning from the target after filtering with the dynamic receiver filter.

B20. The LADAR system of any of paragraphs B1-B19, wherein the LADAR system is configured to determine a distance between the platform and the target based at least in part on the laser signal transmitted to the target and the laser signal returning from the target.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

The invention claimed is:

1. A method of detecting a LADAR signal, the method comprising:
    transmitting a laser signal from a platform, wherein the laser signal has a transmitter center wavelength and a transmitter linewidth;
    returning the laser signal from a target that is moving relative to the platform with a target velocity by directing the laser signal toward the target, wherein the target velocity is a relative velocity of the target relative to the platform in a direction between the platform and the target, and wherein the laser signal returned from the target has a return center wavelength that is offset relative to the transmitter center wavelength by a Doppler offset due to the target velocity;

adjusting a dynamic receiver filter to a receiver center wavelength that is based upon the return center wavelength;

subsequent to the adjusting the dynamic receiver filter, filtering the laser signal returned from the target with the dynamic receiver filter to reject ambient light mingled with the laser signal returned from the target and to produce a filtered laser signal; and detecting the filtered laser signal to determine a distance between the platform and the target.

2. The method of claim 1, wherein the adjusting includes at least one of measuring, estimating, or determining the target velocity based upon at least one of measuring, estimating, or determining a velocity of the platform.

3. The method of claim 1, wherein the adjusting includes adjusting based on at least one of measuring, estimating, or determining the Doppler offset due to the target velocity.

4. The method of claim 1, wherein the adjusting includes adjusting the receiver center wavelength to about equal to the return center wavelength.

5. The method of claim 1, wherein the adjusting includes adjusting the receiver center wavelength to about equal to a sum of the transmitter center wavelength and the Doppler offset.

6. The method of claim 1, wherein the adjusting includes serially changing a center wavelength of the dynamic receiver filter to two or more values, measuring an intensity of the laser signal returned from the target through the dynamic receiver filter at each of the values of the center wavelength, and adjusting the receiver center wavelength to the center wavelength corresponding to a maximum of the intensities.

7. The method of claim 6, wherein the serially changing includes dithering the center wavelength within a range of values between a maximum Doppler-shifted wavelength and a minimum Doppler-shifted wavelength.

8. The method of claim 1, wherein the dynamic receiver filter has a receiver bandwidth that is less than the transmitter linewidth plus twice a magnitude of the Doppler offset.

9. The method of claim 8, wherein the receiver bandwidth is about equal to the transmitter linewidth.

10. The method of claim 8, wherein the receiver bandwidth is less than the transmitter linewidth plus 30 pm.

11. The method of claim 1, wherein a magnitude of the target velocity is at least 100 m/s.

12. The method of claim 1, further comprising determining the distance between the platform and the target based at least in part on the laser signal transmitted to the target and the laser signal returned from the target.

13. A LADAR system comprising:
a LADAR transmitter configured to emit a laser signal from a platform, wherein the laser signal has a transmitter center wavelength and a transmitter linewidth, wherein the transmitter linewidth is less than 30 pm, and wherein the LADAR system is configured to cause the laser signal to return from a target that is moving relative to the platform with a target velocity of at least 100 m/s, wherein the target velocity is a relative velocity of the target relative to the platform in a direction between the platform and the target; and a LADAR receiver configured to detect the laser signal returning from the target to determine a distance between the platform and the target, wherein the LADAR receiver includes a dynamic receiver filter with a receiver center wavelength and a receiver bandwidth, wherein the receiver bandwidth is less than the transmitter linewidth plus 30 pm, wherein the LADAR receiver is configured to adjust the receiver center wavelength to a sum of the transmitter center wavelength and a Doppler offset due to the target velocity.

14. The LADAR system of claim 13, wherein the receiver bandwidth is about equal to the transmitter linewidth.

15. The LADAR system of claim 13, wherein a magnitude of the Doppler offset is at least 1 pm.

16. The LADAR system of claim 13, wherein the receiver center wavelength is tunable at least between the transmitter center wavelength minus an offset and the transmitter center wavelength plus the offset, and wherein the offset is at least 1 pm.

17. The LADAR system of claim 13, wherein the dynamic receiver filter includes at least one of an optical resonator, an etalon, an air-spaced etalon, a solid etalon, an angle-tuned etalon, a temperature-tuned etalon, a pressure-tuned etalon, a whispering gallery mode resonator, a distributed Bragg grating, a fiber Bragg grating, an absorptive filter, a colored glass filter, or an interference filter.

18. The LADAR system of claim 13, wherein the dynamic receiver filter includes a first dynamic receiver filter element and a second dynamic receiver filter element, and wherein a FWHM (full width at half maximum) of the first dynamic receiver filter element is greater than a FWHM of the second dynamic receiver filter element.

19. The LADAR system of claim 18, wherein the first dynamic receiver filter element has a static center wavelength and the second dynamic receiver filter element has a tunable center wavelength.

20. The LADAR system of claim 18, wherein the dynamic receiver filter includes a third dynamic receiver filter element, wherein a FWHM of the third dynamic receiver filter element is less than the FWHM of the second dynamic receiver filter element, and wherein the third dynamic receiver filter element has a tunable center wavelength.

* * * * *